US011052875B2

(12) United States Patent
Mullen et al.

(10) Patent No.: US 11,052,875 B2
(45) Date of Patent: Jul. 6, 2021

(54) DEFROSTER SYSTEM FOR A MOTOR VEHICLE

(71) Applicant: FORD GLOBAL TECHNOLOGIES, LLC, Dearborn, MI (US)

(72) Inventors: Gary D. Mullen, Plymouth, MI (US); Nicholas A. Mazzocchi, Ann Arbor, MI (US); Mitali Chakrabarti, Canton, MI (US); Anthony Ligi, Jr., Chelsea, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 211 days.

(21) Appl. No.: 16/182,904

(22) Filed: Nov. 7, 2018

(65) Prior Publication Data

US 2020/0139933 A1    May 7, 2020

(51) Int. Cl.
*B60S 1/02* (2006.01)
*B62D 25/14* (2006.01)

(52) U.S. Cl.
CPC ............ *B60S 1/023* (2013.01); *B62D 25/142* (2013.01)

(58) Field of Classification Search
CPC ..... B60S 1/023; B62D 25/142; B60H 1/0055; B60H 1/34; B60H 1/3407; B60H 2001/3492
USPC ....................................................... 454/127
See application file for complete search history.

(56) References Cited

U.S. PATENT DOCUMENTS

| 3,608,469 | A | * | 9/1971 | Mutoh | ................... B60S 1/54 454/127 |
|---|---|---|---|---|---|
| 5,187,349 | A | | 2/1993 | Curhan et al. | |
| 9,453,142 | B2 | | 9/2016 | Rolland et al. | |
| 2006/0030256 | A1 | | 2/2006 | Kamano et al. | |
| 2016/0121852 | A1 | * | 5/2016 | Yoshimura | ............ B60H 1/242 454/127 |
| 2019/0210464 | A1 | * | 7/2019 | Dormanns | ........... B62D 25/145 |

FOREIGN PATENT DOCUMENTS

| CN | 103980608 | 8/2014 |
|---|---|---|
| CN | 104226988 | 12/2014 |
| CN | 106827846 | 6/2017 |

* cited by examiner

*Primary Examiner* — Kenneth J Hansen
*Assistant Examiner* — Dana K Tighe
(74) *Attorney, Agent, or Firm* — David Coppiellie; Price Heneveld LLP

(57) ABSTRACT

A unitary defroster system for a motor vehicle windshield comprises an instrument panel substrate, an HVAC supply source, and an air supply plenum in fluid communication with the HVAC supply source and terminating in a plurality of individually configured defroster nozzle ducts conjoined with the instrument panel substrate and aligned in a substantially linear row parallel to and proximate an interior surface of the windshield. The unitary defroster system is formed by an additive manufacturing process and at least two of the ducts are configured and arranged to deliver a different air flow to the interior surface of the windshield.

18 Claims, 8 Drawing Sheets

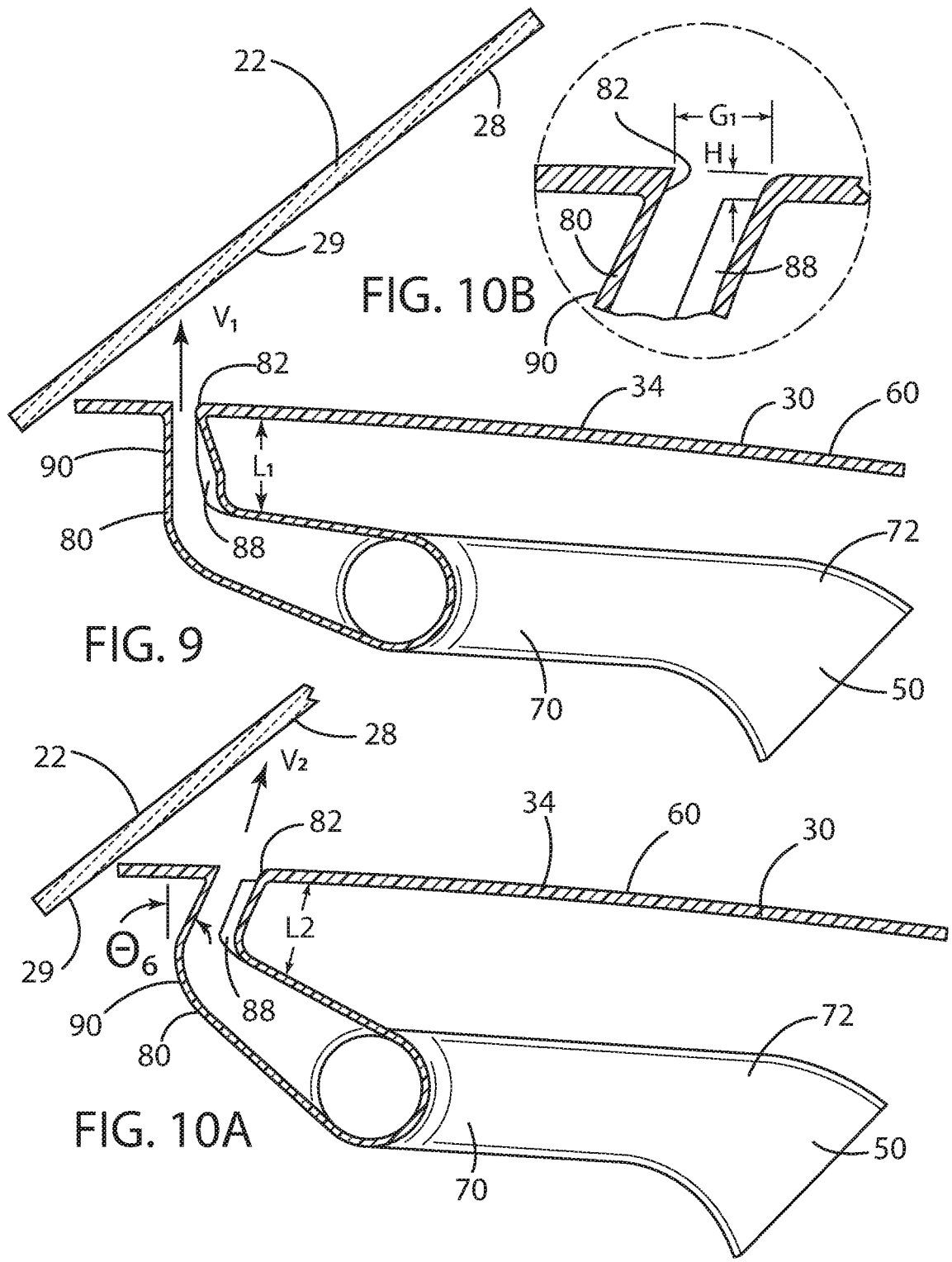

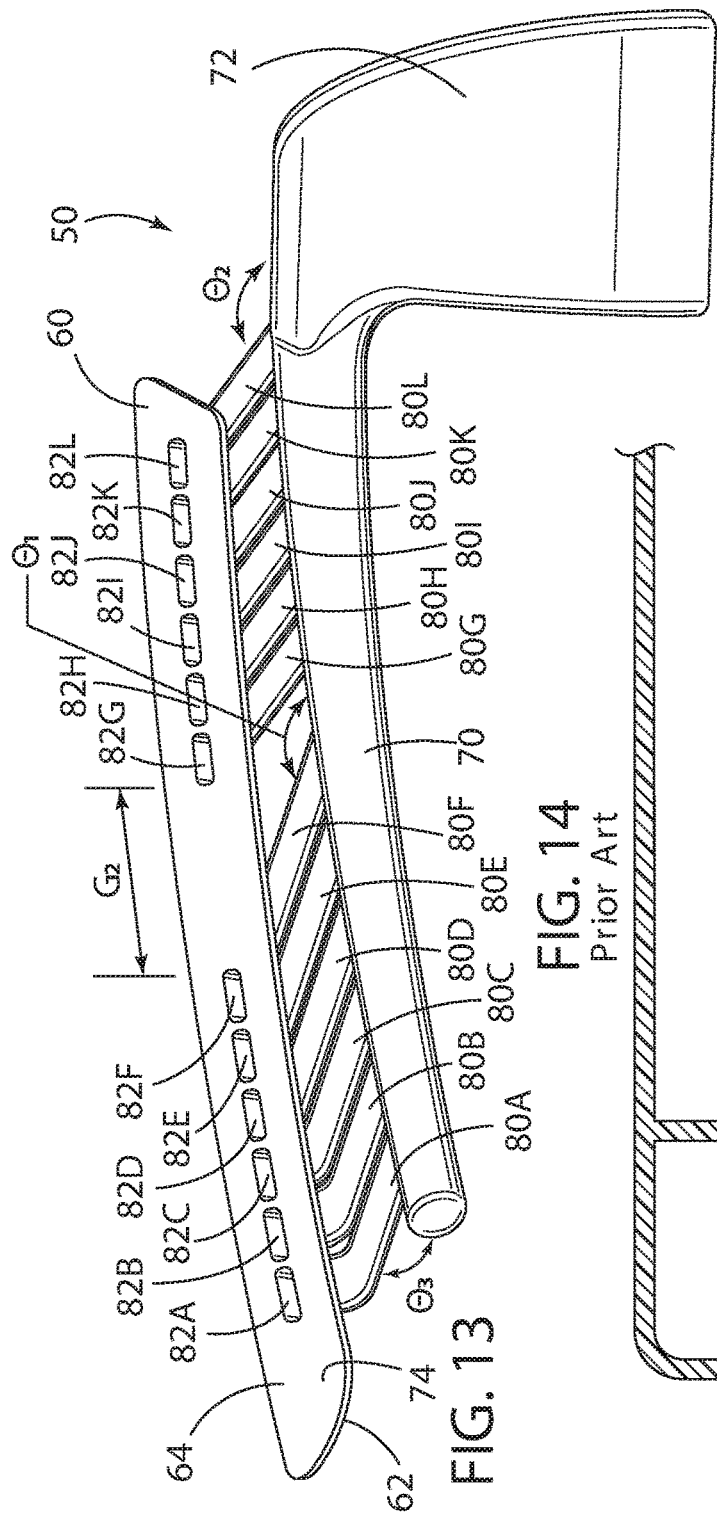
FIG. 13
FIG. 14 Prior Art
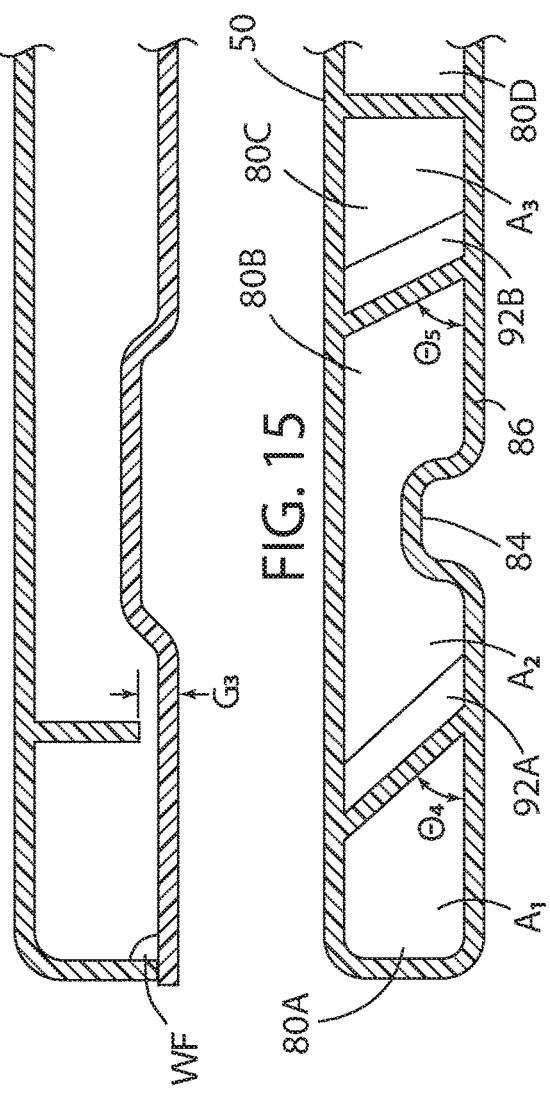
FIG. 15

DEFROSTER SYSTEM FOR A MOTOR VEHICLE

FIELD OF THE DISCLOSURE

The present disclosure generally relates to a defroster system for a motor vehicle. More specifically, the present disclosure relates to a defroster system having an air supply plenum terminating in a plurality of individually configured defroster nozzle ducts disposed proximate a windshield of the motor vehicle.

BACKGROUND OF THE INVENTION

Defroster systems for motor vehicles typically comprise an air supply plenum terminating in discharge openings for defroster nozzle ducts disposed proximate a windshield of the motor vehicle. Such defroster systems may be fabricated from multiple injection or blow molded components welded or otherwise fastened one to the other. Such defroster systems may include defroster nozzle ducts that must, in turn, interface with an instrument panel substrate or defroster bezel, again typically by welding, where the vanes, defroster nozzle ducts sections, and weld joints of the defroster systems dictate geometry and package space.

In such defroster systems, concessions on geometry made to accommodate welding and attachment often occur, such as the geometry of the defroster nozzle ducts preventing welding completely around the defroster nozzle ducts due to weld horn access, which, in turn, compromises pressure build-up within the defroster system. Thin or complex geometries may not even be possible due to die draw and molding technology constraints. Thus, uneven air flow over the inner surface of the windshield may occur, causing uneven dissipation of frost on the exterior surface of the windshield or condensation on the interior surface of the windshield. Accordingly, a defroster system that provides additional adjustability and flexibility in the design of the defroster nozzle ducts to provide uniform air flow over the interior surface of the windshield is desired.

SUMMARY OF THE INVENTION

According to a first aspect of the present disclosure, a unitary defroster system for a motor vehicle windshield and formed by an additive manufacturing process comprises an instrument panel substrate and an air supply plenum terminating in a plurality of individually configured defroster nozzle ducts conjoined with the instrument panel substrate and disposed proximate an interior surface of the windshield. The ducts are configured and arranged to deliver a substantially uniform air flow pattern to the interior surface of the windshield.

Embodiments of the first aspect of the present disclosure can include any one or a combination of the following features:
- the ducts are configured and arranged to deliver a substantially laminar air flow to the interior surface of the windshield;
- at least two of the plurality of individually configured defroster nozzle ducts conjoined with the instrument panel substrate have a unique configuration;
- the unique configuration of the least two of the plurality of individually configured defroster nozzle ducts conjoined with the instrument panel substrate comprises a discharge angle of the duct defroster nozzle ducts relative windshield;
- the unique configuration of the least two of the plurality of individually configured defroster nozzle ducts conjoined with the instrument panel substrate comprises an airflow angle into the duct defroster nozzle ducts relative the air plenum;
- the unique configuration of the least two of the plurality of individually configured defroster nozzle ducts conjoined with the instrument panel substrate comprises a longitudinal cross section area and/or shape of the duct defroster nozzle ducts;
- the unique configuration of the least two of the plurality of individually configured defroster nozzle ducts conjoined with the instrument panel substrate comprises a discharge orifice of the duct defroster nozzle ducts, whereby an exit velocity of the airflow from the least two of the plurality of individually configured defroster nozzle ducts conjoined with the instrument panel substrate if different;
- the unique configuration of the least two of the plurality of individually configured defroster nozzle ducts conjoined with the instrument panel substrate comprises a constriction proximate the discharge orifice of the duct defroster nozzle ducts;
- the instrument panel substrate is integrated into an upper surface of an instrument panel; and
- the instrument panel substrate substantially defines an upper surface of an instrument panel.

According to a second aspect of the present disclosure, an unitary defroster system for a motor vehicle windshield comprising an instrument panel substrate and an air supply plenum terminating in a plurality of individually configured defroster nozzle ducts conjoined with the instrument panel substrate and aligned in a substantially linear row parallel to and proximate an interior surface of the windshield. The unitary defroster system is formed by an additive manufacturing process and the ducts are configured and arranged to deliver a substantially uniform air flow pattern to the interior surface of the windshield.

Embodiments of the second aspect of the present disclosure can include any one or a combination of the following features:
- the spacing between at least three of the plurality of the individually configured defroster nozzle ducts is irregular;
- at least one of the plurality of individually configured defroster nozzle ducts conjoined with the instrument panel substrate have a configuration comprising a reduced cross-sectional profile proximate a discharge opening of the one of the nozzle ducts;
- the reduced cross-sectional profile proximate a discharge opening of the one of the nozzle ducts comprises an increased wall thickness of a portion of the nozzle duct situated furthest from the windshield and vertically disposed at least 2 mm below an outer surface of the instrument panel substrate;
- at least one of the plurality of individually configured defroster nozzle ducts conjoined with the instrument panel substrate has a unique configuration comprising an inclined vane disposed within the one of the duct defroster nozzle duct; and
- at least two of the plurality of individually configured defroster nozzle ducts conjoined with the instrument panel substrate have a unique configuration comprising a difference in a vertical length of the duct defroster nozzle ducts.

According to a third aspect of the present disclosure, an unitary defroster system for a motor vehicle windshield comprises an instrument panel substrate, an HVAC supply source; and an air supply plenum in fluid communication with the HVAC supply source and terminating in a plurality of individually configured defroster nozzle ducts conjoined with the instrument panel substrate and aligned in a substantially linear row parallel to and proximate an interior surface of the windshield. The unitary defroster system is formed by an additive manufacturing process and at least two of the ducts are configured and arranged to deliver a different air flow to the interior surface of the windshield.

Embodiments of the third aspect of the present disclosure can include any one or a combination of the following features:
- the different air flow comprises a difference in a velocity of the airflow discharged from the least two of the ducts;
- the different air flow comprises a difference in a direction of the airflow discharged from the least two of the ducts; and
- the different air flow comprises a difference in an air mass flow quantity of the airflow discharged from the least two of the ducts.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9 is a sectional view of the driver side of another embodiment of the defroster system of the present disclosure, taken along the line VIII-VIII in FIG. 2;

FIG. 10A is a sectional view of the driver side of a further embodiment of the defroster system of the present disclosure, taken along the line VIII-VIII in FIG. 2;

FIG. 10B is an enlarged sectional view of the discharge opening of an individually configured defroster nozzle duct of the defroster system of the present disclosure shown in FIG. 10A, taken along the line VIII-VIII in FIG. 2;

FIG. 13 is a perspective rear view of the driver side of an additional embodiment of the defroster system of the present disclosure;

FIG. 14 is a top view of the discharge opening of a defroster nozzle duct for a defroster system of the prior art; and FIG. 15 is a top view of the discharge opening of the individually configured defroster nozzle duct of the defroster system of the present disclosure shown in FIG. 2.

DETAILED DESCRIPTION OF THE PREFERRED EMBODIMENTS

Figure 1:
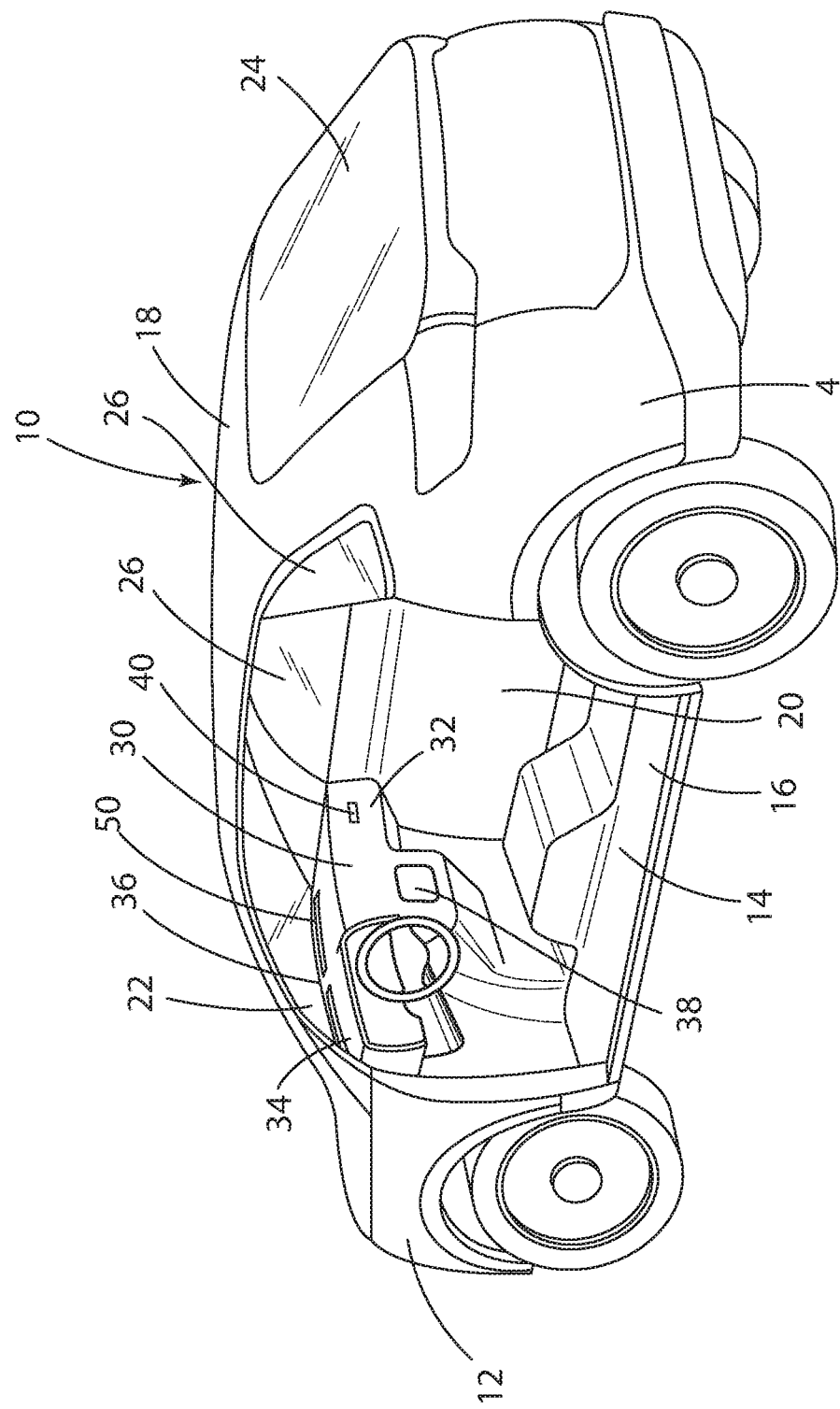
FIG. 1 is a perspective view of a motor vehicle equipped with the defroster system of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations related to a defroster system. Accordingly, the components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, reference numeral 10 generally designates the motor vehicle. The motor vehicle 10 may be a wheeled motor vehicle, a boat, a plane, a driver-controlled vehicle, and/or an autonomous vehicle. The motor vehicle 10 may be equipped with a body 12 defining therein an interior passenger compartment 14 generally defined by a floorboard 16, roof panel 18, side doors 20, a forward windshield 22, rear window 24, and side windows 26.

Referring again to FIG. 1, an instrument panel 30 may be situated in front of the driver and passenger seating positions (not shown) proximate the forward windshield 22. The instrument panel 30 may have a rearward face 32 as well as an upper surface 34 that are adjacent the forward windshield 22 at a forward edge 36 thereof.

The rearward face 32 of the instrument panel 30 may be equipped with the various gauges and controls by which the motor vehicle 10 may be operated, as well as a heating, ventilation, and air conditioning (HVAC) system 38 housed within the instrument panel 30. The HVAC system 38 is provided with discharge ducts by which the heated and/or cooled airflow from the HVAC system 38 may be distributed within the passenger compartment 14. More particularly, the HVAC system 38 may be provided with rearward directed discharge ducts 40 directed toward the occupants and the rearward portions of the passenger compartment 14, as well as a forward-positioned defroster system 50.

Figure 11:
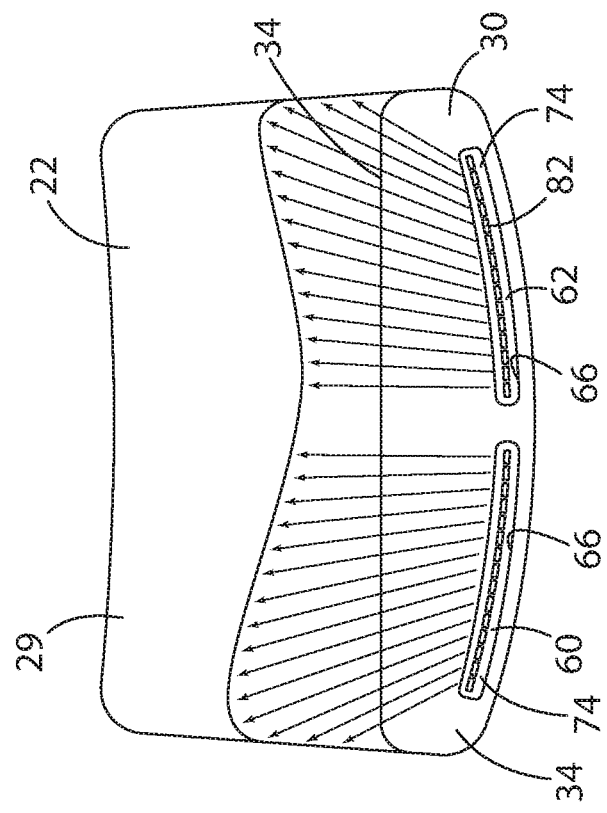
FIG. 11 is a first pattern for the mass airflow over the windshield of the defroster system of the present disclosure shown in FIG. 2.
Figure 12:
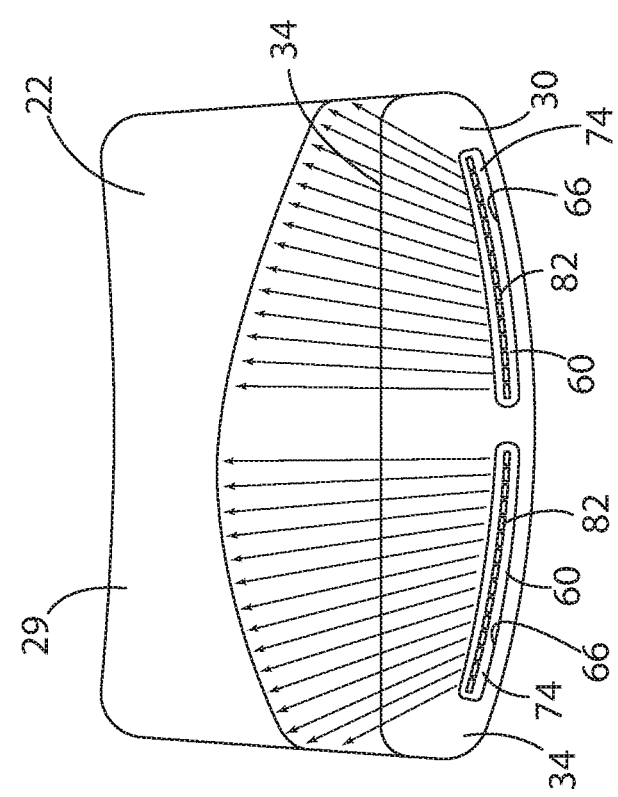
FIG. 12 is a second pattern for the mass airflow over the windshield of the defroster system of the present disclosure shown in FIG. 2.

The defroster system 50 may include an instrument panel substrate 60 disposed proximate an interior surface 28 of the windshield 22 and an air supply plenum 70 terminating in a plurality of individually configured defroster nozzle ducts 80A-80O conjoined with the instrument panel substrate 60, as shown in FIGS. 2-5, for example. The instrument panel substrate 60 may be integrated into the upper surface 34 of the instrument panel 30 as a separate component. More particularly, the instrument panel substrate 60 may be formed as a planar surface having an outer perimeter 62 and a central body 64 immediately surrounding the discharge openings 82 for the individually configured defroster nozzle ducts 80, as shown, for example, in FIGS. 2, 3, 5, and 14, where the outer perimeter 62 of the instrument panel substrate 60 is subsequently received and installed in a corresponding opening 66, as shown in FIGS. 11 and 12, in the instrument panel upper surface 34. Alternatively, as shown in FIGS. 4 and 6-10B, the instrument panel substrate 60 may substantially define the upper surface 34 of the instrument panel 30 and the defroster system 50 and the instrument panel 30 may be entirely formed as a unitary single piece component.

Figure 2:
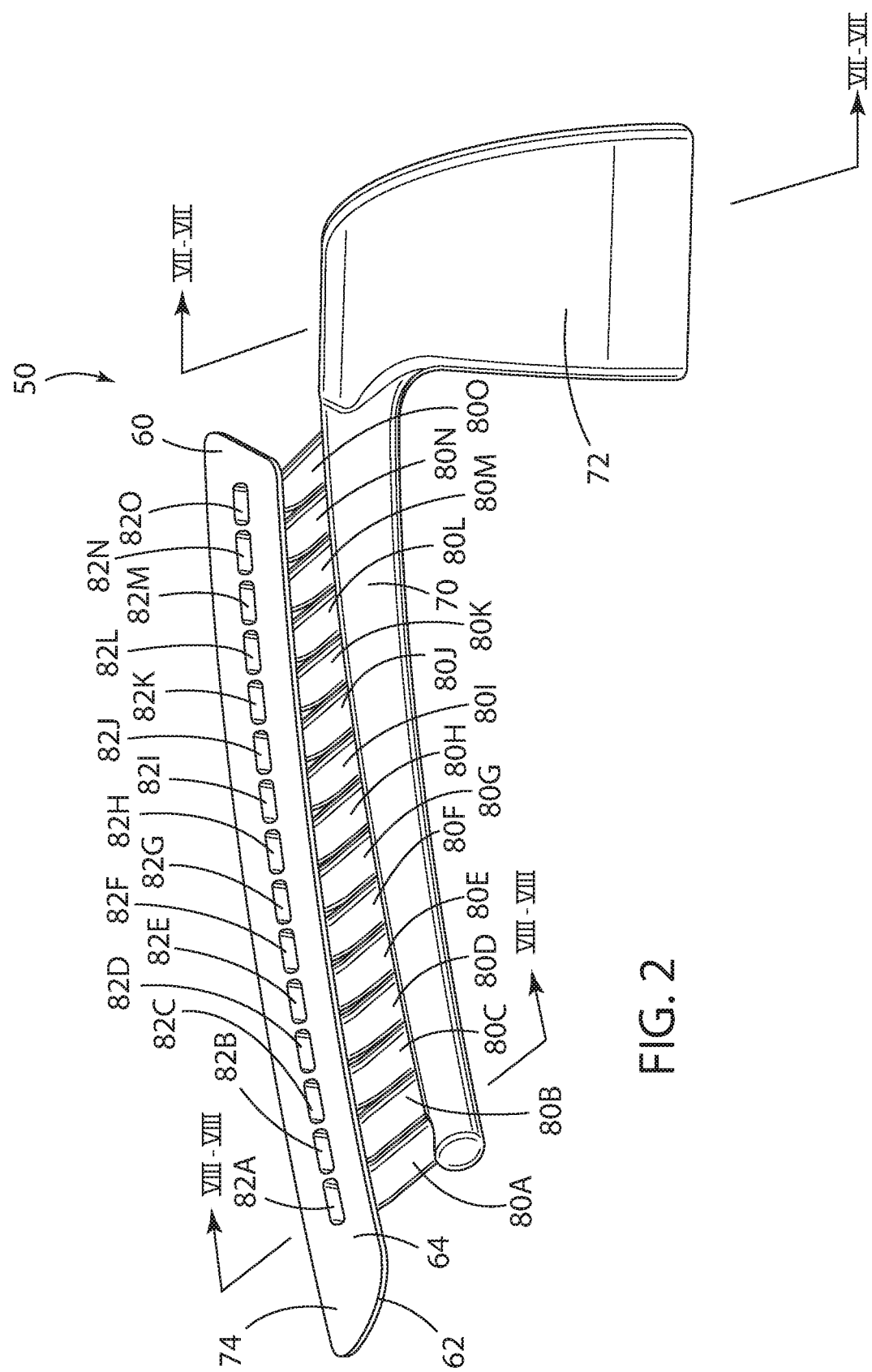
FIG. 2 is a perspective rear view of the driver side of one embodiment of the defroster system of the present disclosure.
Figure 3:
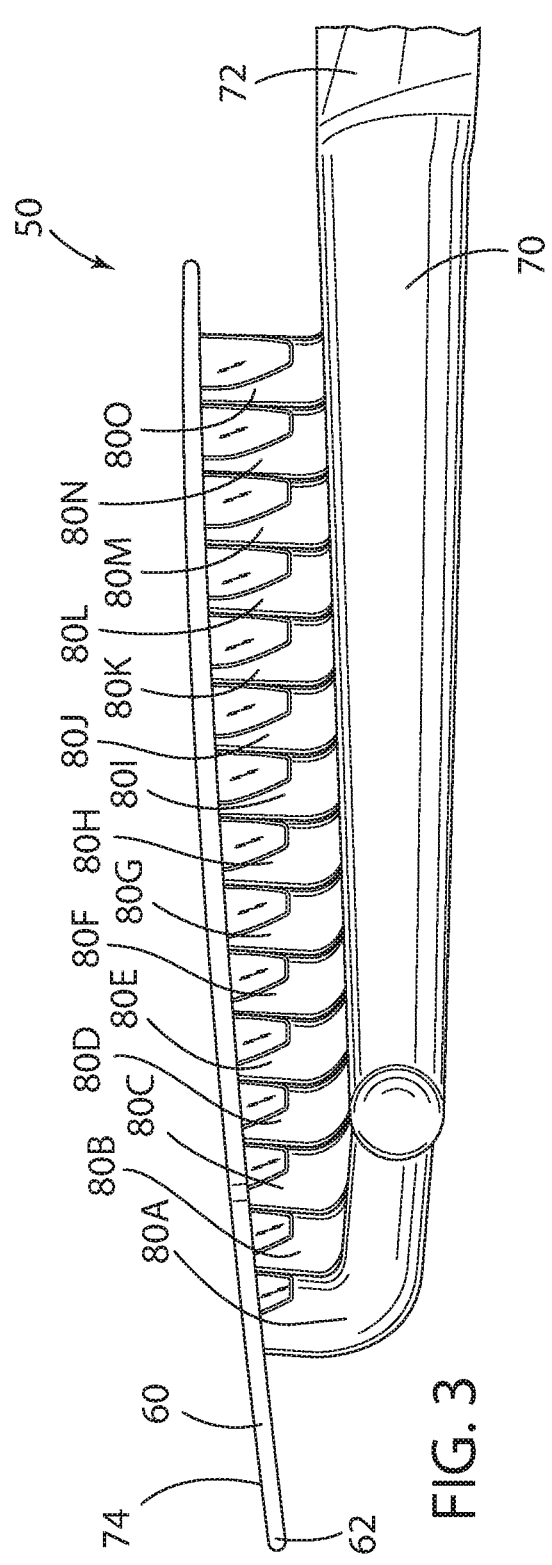
FIG. 3 is a rear view of the driver side of the defroster system of the present disclosure shown in FIG. 2.

As further discussed below, the individually configured defroster nozzle ducts 80 of the defroster system 50 in accordance with the present disclosure are supplied with an air mass flow through the air supply plenum 70 and may be configured and arranged to deliver a substantially uniform air flow pattern to the interior surface 28 of the windshield 22 to promote even air flow over the interior surface 38 of the windshield 22, allowing even dissipation of frost on the exterior surface 29 of the windshield 22 and/or condensation on the interior surface 28 of the windshield 22. As shown in FIG. 2, a plurality of individually configured defroster nozzle ducts 80A-80O may be provided. While fifteen such individually configured defroster nozzle ducts 80A-80O are shown in FIG. 2, more or less may be used as required to obtain the desired uniform air flow pattern on the interior surface 28 of the windshield 22.

Figure 4:
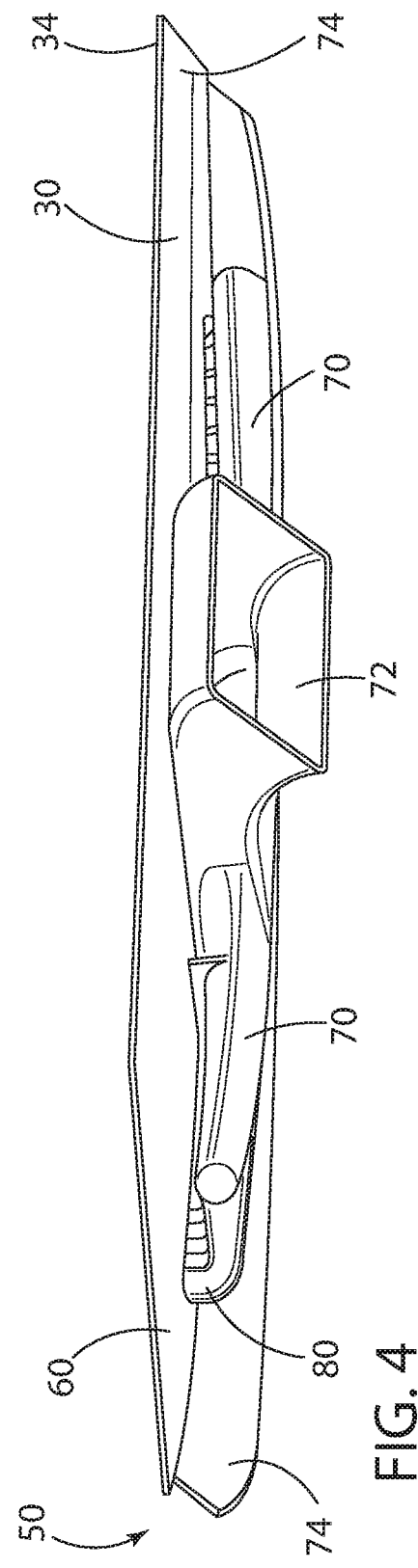
FIG. 4 is a perspective rear view of the driver side and passenger side of the defroster system of the present disclosure shown in FIG. 2, sharing a common inlet.
Figure 5:
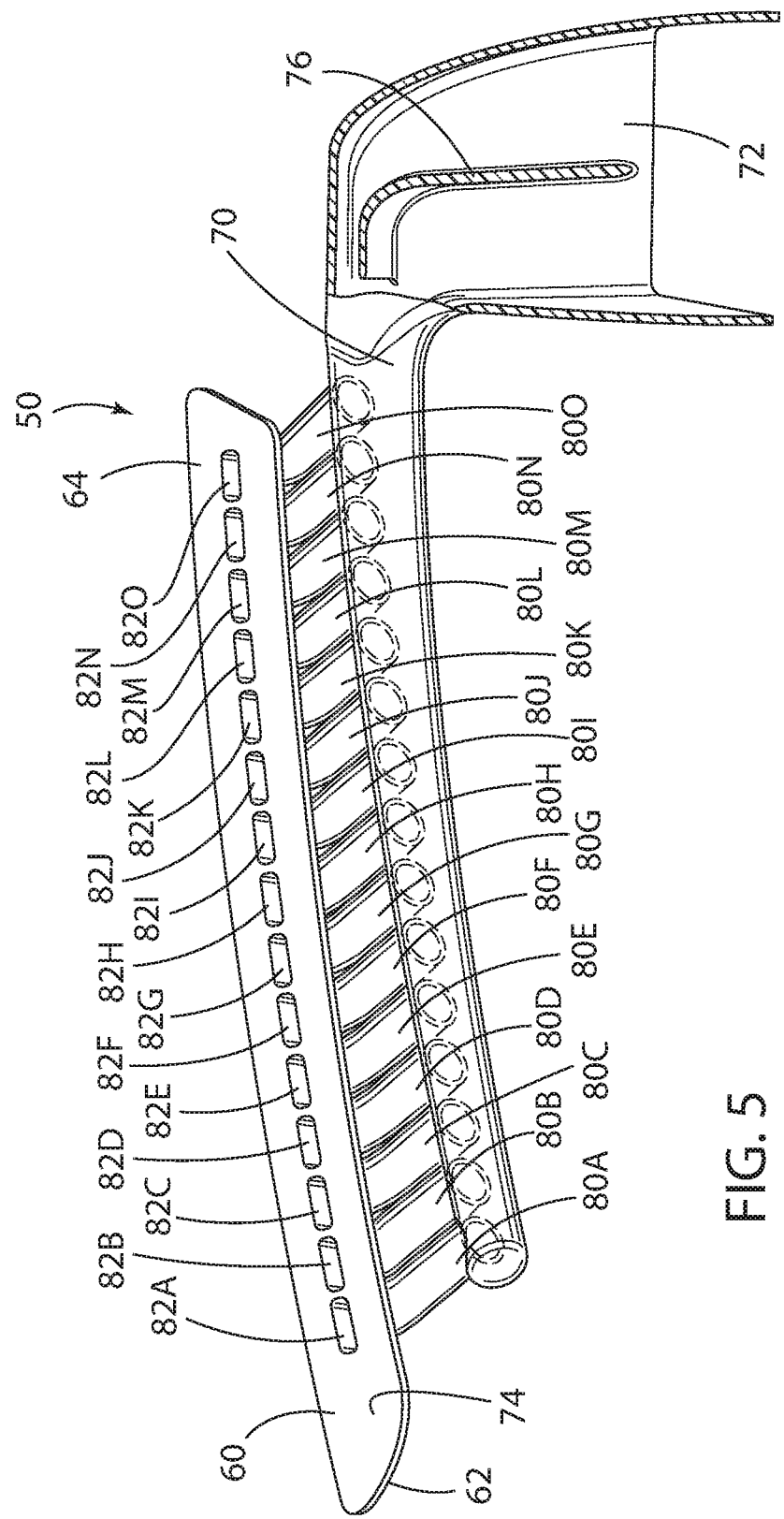
FIG. 5 is a top perspective rear view of the driver side of the defroster system of the present disclosure shown in FIG. 2.
Figure 6:
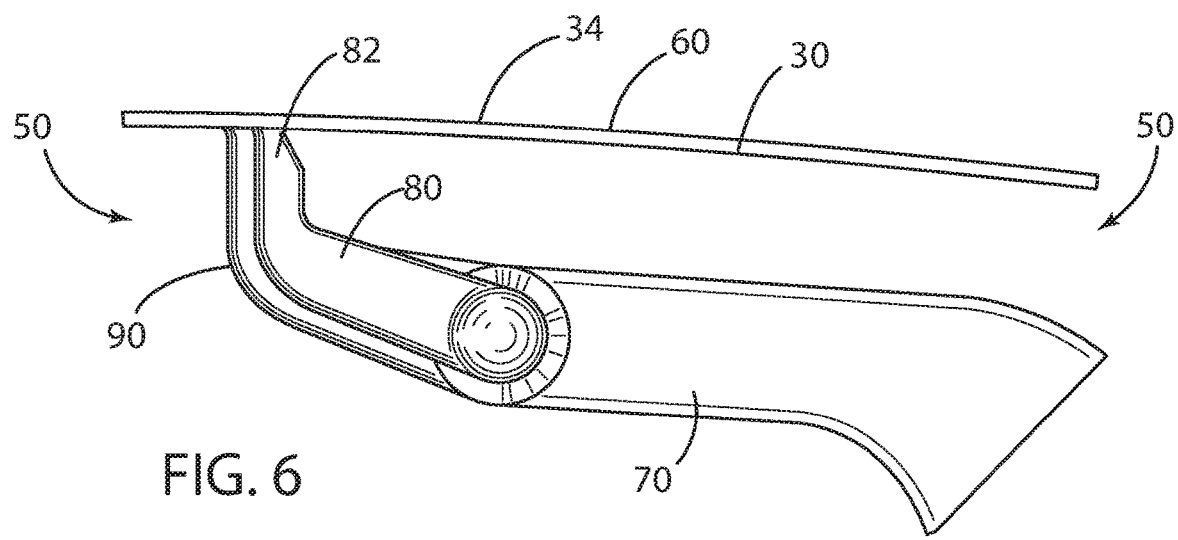
FIG. 6 is a side view of the driver side of the defroster system of the present disclosure.
Figure 7:
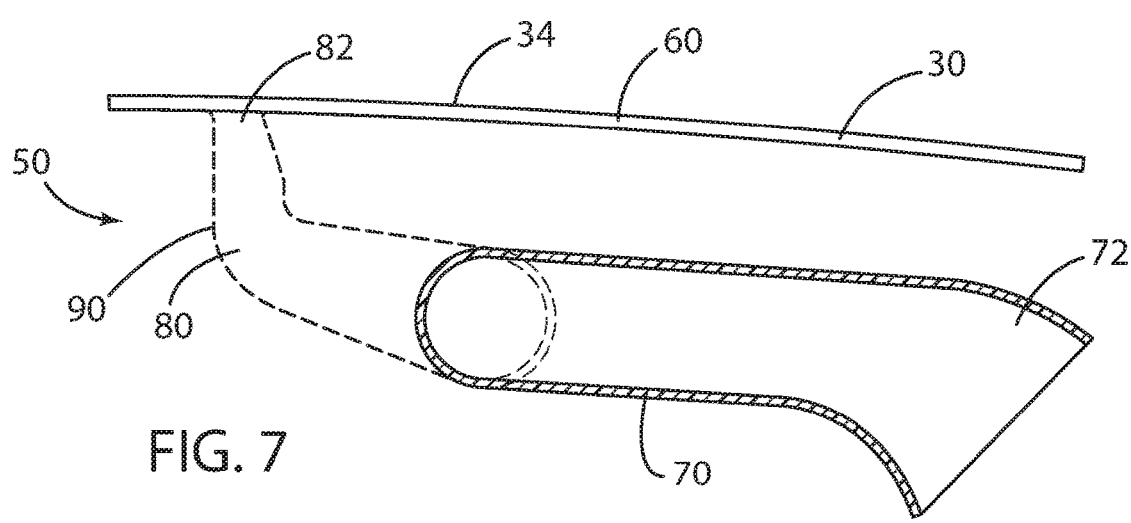
FIG. 7 is a partial sectional view of the driver side of the defroster system of the present disclosure, taken along the line VII-VII in FIG. 2.
Figure 8:
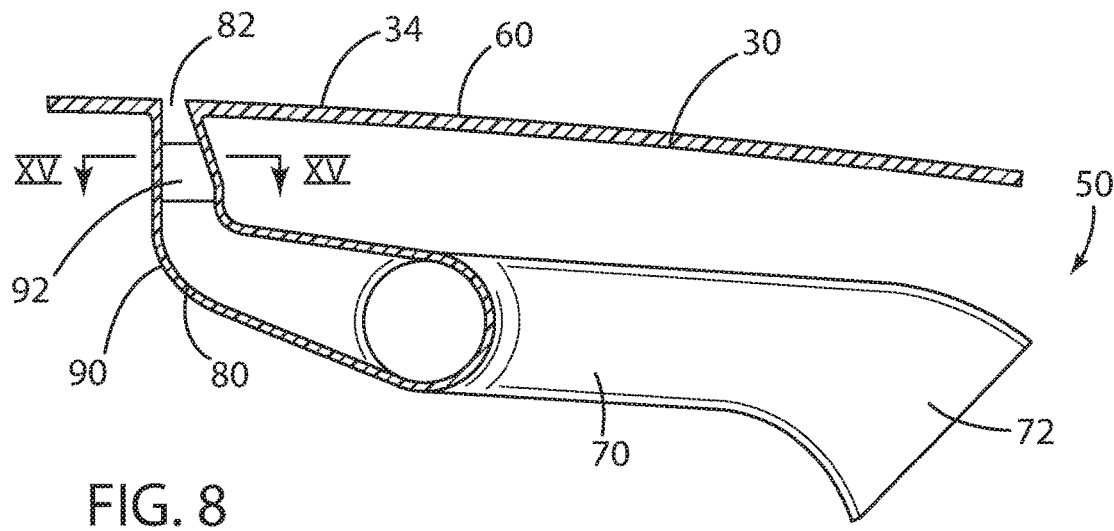
FIG. 8 is a sectional view of the driver side of the defroster system of the present disclosure, taken along the line VIII-VIII in FIG. 2.

Specifically, a predetermined air mass flow at a predetermined temperature is supplied at an inlet 72 of the air supply plenum 70 by the HVAC system 38, depending on the settings of the HVAC system 38, which may be automatically or manually controlled. As shown in FIG. 4, two separate air supply plenums 70 may be provided to direct air mass flow through the instrument panel substrate 60 disposed on and directed toward each of the driver side or passenger side of the motor vehicle 10 proximate the interior surface 28 of the windshield 22, respectively. Each of the separate driver side and passenger side air supply plenums 70 may be supplied by and in fluid communication with a common inlet 72, as shown in FIG. 4, which is ultimately in fluid communication with the HVAC system 38. Alternatively, as shown in FIGS. 2 and 5, for example, each of the separate driver side and passenger side air supply plenums 70 may be supplied by and in fluid communication with an individual inlet 72 dedicated to that particular side the motor vehicle 10.

The air supply plenum 70 then directs this air mass to and through the instrument panel substrate 60 via the plurality of individually configured defroster nozzle ducts 80 each provided with a terminal discharge opening 82 to build air pressure, which may then be distributed equally along the interior surface 28 of the windshield 22. As shown in FIG. 2, discharge openings 82A-82O may be provided. A particularly advantageous feature of the present disclosure is that each of the individually configured defroster nozzle ducts 80 may be uniquely tuned and designed to provide a specific air velocity specifically and intentionally directed to a specific portion of the interior surface 28 of the windshield 22 to provide uniform clearing of the windshield 22.

In accordance with the present disclosure, the defroster system 50 may be fabricated as a unitary structure through the use of an additive manufacturing process, such as a 3D printing process. That is, the instrument panel substrate 60, air supply plenum 70, and the individually configured defroster nozzle ducts 80 conjoined with the instrument panel substrate 60 may all be printed as a single sealed part. Preferably, the defroster system 50 is fabricated from acrylonitrile butadiene styrene (ABS) or a polycarbonate/ABS polymer blend. Such a construction eliminates the compromises and concessions on geometry required by the use of a defroster system fabricated from several discrete parts that must be joined together to form an assembly. In such multicomponent assemblies, compromises and concessions must be made to accommodate welding and attachment, such as the aforementioned geometry of the defroster nozzle ducts that prevents welding completely around the defroster nozzle ducts due to weld horn access.

For example, as shown in FIG. 14, looking down into prior art defroster nozzle ducts disposed on the outboard end of the driver side air supply plenums, welding flanges WF, and air gaps $G_3$ were features that commonly frustrate design efforts to configure and arrange defroster systems that could deliver a substantially uniform air flow pattern to the interior surface of the windshield to promote even air flow over the inner surface of the windshield. The resulting uneven air flow pattern to the interior surface 28 of the windshield 22 prevented even dissipation of frost on the exterior surface 29 of the windshield 22 and/or condensation on the interior surface 28 of the windshield 22. While foam seals could be applied to compensate for the gaps, such foam seals impose costs in material and labor.

In contrast, as shown in FIG. 15, again looking down into the air supply plenum 70 and individually configured defroster nozzle ducts 80 of the present disclosure disposed on the outboard end 74 of the driver side air supply plenum 70, welding flanges WF and air gaps $G_3$ may be eliminated by forming the defroster system 50 as a unitary structure through the use of an additive manufacturing process. In addition, foam seals to provide a robust seal and allow desired air pressure generation within the air supply plenum 70 may be eliminated, reducing the noise of the air mass flow through the defroster system, as well as allowing the creation of a very thin cross-sectional wall thickness. This is significant, in that thin wall sections make larger cross sections possible for the each of the individually configured defroster nozzle ducts 80, allowing greater air mass flow therethrough. In addition, the defroster system 50 fabricated as a unitary structure through the use of an additive manufacturing process eliminates costly welding fixtures and processes, as well as eliminating molding tooling and facilitating rapid design changes.

The defroster system 50 of the present disclosure fabricated as a unitary structure through the use of an additive manufacturing process also tends to improve the overall quality of fit and finish of the defroster system 50, particularly adjacent the instrument panel substrate 60, improving its appearance and creating the potential for graphic detail in the individually configured defroster nozzle ducts 80. In addition, orifices and conduits for the passage of wiring and other components may be readily incorporated into the defroster system 50 in locations and along paths that traditional injection or blow molding would not allow.

The defroster system 50 of the present disclosure also eliminates joints between assembled components. Such joints tend to create air leaks under high air mass flow conditions, and thereby create additional noise from the defroster system 50. Elimination of such joints that previously have caused such leakage is obtained by a defroster system 50 fabricated as a unitary structure through the use of an additive manufacturing process.

Each of the individually configured defroster nozzle ducts 80 can be individually designed so that air mass flow emerging from the individually configured defroster nozzle duct 80 can be uniquely regulated. As shown in FIG. 15, each of the individually configured defroster nozzle ducts 80A, 80B, and 80C may have a unique longitudinal cross section area $A_1$, $A_2$, or $A_3$. Each of the areas $A_1$, $A_2$, and $A_3$ may be different, hence, the individually configured defroster nozzle ducts 80 can be uniquely designed.

As shown in FIGS. 9, 10A, and 10B, the shape of the individually configured defroster nozzle ducts 80 can be uniquely shaped. That is, for example, indents 84 may also be readily formed in the side wall 86 of individually configured defroster nozzle duct 80B, as shown in FIG. 15, to increase the air mass flow through the individually configured defroster nozzle duct 80B relative adjacent individually configured defroster nozzle ducts 80A and 80C.

In addition, each of the discharge openings 82 of each of the individually configured defroster nozzle ducts 80 can be individually designed, whereby the exit velocity and/or air mass flow of the airflow from at least one of the individually configured defroster nozzle ducts 80 is different than other individually configured defroster nozzle ducts 80. This may accomplished, for example, by the use of a constriction 88 disposed proximate the discharge opening 82 of the duct defroster nozzle duct 80. As shown in FIG. 10B, the constriction 88 creates a reduced cross-sectional profile proximate the discharge opening 82 of one of the individually configured defroster nozzle ducts 80 otherwise having a nominal width $G_1$. The constriction 88 forming the reduced cross-sectional profile proximate the discharge opening 82 of the one of the individually configured defroster nozzle ducts 80 may comprise an increased wall thickness of a portion of the individually configured defroster nozzle duct 80 situated furthest from the windshield 22 and may be vertically disposed a distance H (preferably, at least 2 mm) below the upper surface 34 of the instrument panel substrate 60 and the discharge opening 82, as best shown in FIG. 10B. The constriction 88 may, thus, be essentially hidden from view.

Also, the individually configured defroster nozzle ducts 80 can be individually oriented relative the air supply plenum 70 so that air mass flow emerging from the air supply plenum 70 and entering the individually configured defroster nozzle duct 80 can be uniquely directed toward a predetermined region of the windshield 22 so as to provide a discrete and predetermined air mass flow rate at predetermined velocities and thereby contribute to the overall even airflow over the inner surface of the windshield 22. This is perhaps best shown in FIG. 13, where the individually configured defroster nozzle duct 80F is set at an angle of $\Theta_1$ relative the air supply plenum 70. In contrast, for example, other individually configured defroster nozzle ducts 80L and 80A may be set at angles $\Theta_2$ and $\Theta_3$ relative the air supply plenum 70, respectively. Each of angles of $\Theta_1$, $\Theta_2$, and $\Theta_3$ may be oriented at a different angle relative the air supply plenum 70, hence, the individually configured defroster nozzle ducts 80 can be uniquely designed. In addition, as shown in FIG. 13, the unique angles of the individually configured defroster nozzle ducts 80 may be employed to create unique gaps or spacing between at the discharge openings 82 of the individually configured defroster nozzle ducts 80, which may be set at irregular intervals $G_2$ to further enhance the precise delivery of air mass flow to the interior surface 28 of the windshield 22.

In a similar vein, the individually configured defroster nozzle ducts 80 can be individually sized and their direction of discharge uniquely oriented relative the instrument panel substrate 60 so that the air mass flow emerging from the discharge opening 82 of the individually configured defroster nozzle ducts 80 can be uniquely directed toward a predetermined region of the windshield 22 so as to provide a discrete and predetermined air mass flow rate at predetermined velocities and thereby contribute to the overall even airflow over the inner surface of the windshield 22. This is perhaps best shown in FIG. 9, where the individually configured defroster nozzle duct 80 has a discharge vertical length of $L_1$ and is set at an angle perpendicular to the upper surface 34 of the instrument panel substrate 60, wherein the air mass flow through the individually configured defroster nozzle duct 80 is directed along a vector $V_1$.

In contrast, as shown in FIGS. 10A and 10B, for example, another individually configured defroster nozzle duct 80 may be configured with a discharge vertical length of $L_2$ and be set at an angle of $\Theta_6$ relative the upper surface 34 of the instrument panel substrate 60. Each of discharge vertical lengths of $L_1$ and $L_2$ may different, hence, the individually configured defroster nozzle ducts 80 can be uniquely designed. Preferably, for packaging purposes, the discharge vertical length is between 30 mm to 50 mm. As a result, air mass flow can now be put into tight spaces due to no need for sealing or welding flanges.

As further shown in FIGS. 10A and 10B, the forward wall 90 of the individually configured defroster nozzle duct 80 may be displaced forward of the discharge opening 82 of the individually configured defroster nozzle duct 80 to create a rearward direction of the air mass flow through the individually configured defroster nozzle duct 80 along a vector $V_2$, which has a greater component directed along and parallel to interior surface 28 of the windshield 22. By such an individual configuration, the individually configured defroster nozzle duct 80 may be adapted to provide laminar air flow rather than turbulent air flow through the individually configured defroster nozzle duct 80. Laminar air flow, in turn, tends to generate lower air force, smoother air flow, more uniform delivery of air to the interior surface 28 of the forward windshield 22, less friction, and much less noise, as well as maintaining the temperature of cooled air. Such laminar air flow within the individually configured defroster nozzle ducts 80 is uniquely obtained via fabrication of the defroster system 50 as a unitary, single-piece component, and, more particularly, by forming the defroster system 50 by an additive manufacturing process, such as a 3D printing process to form a unitary component. As shown, the angle $\Theta_6$ relative the upper surface 34 of the instrument panel substrate 60 can now be made which has traditionally been unavailable due to die lock created by production injection or blow molding tools.

Further, design freedom is enhanced in that the elimination of weld flanges WF now allows the flow angles within the individually configured defroster nozzle ducts 80 relative to the windshield 22 to become more open and to be directed. With no flanges required, geometry in tight sections becomes feasible.

For example, as shown in FIG. 15, the defroster system 50 fabricated as a unitary structure through the use of an additive manufacturing process may be provided with multiple vanes 92 that individually direct and aim the airflow from each individually configured defroster nozzle duct 80 in a unique and intentional manner in order to promote even air flow over the inner surface of the windshield 22, allowing even dissipation of frost on the exterior surface 29 of the windshield 22 or condensation on the interior surface 28 of the windshield 22. As shown in FIG. 15, a first vane 92A may be set at an angle $\Theta_4$ between individually configured defroster nozzle ducts 80A and 80B, while the adjacent, individually configured defroster nozzle ducts 80B and 80C may be separated by a second vane 92B set at an angle $\Theta_5$. Each vane 92A and 92B may be set at a unique and compound angle. Again, the individually configured defroster nozzle ducts 80 can be uniquely designed.

In addition to allowing for more or less open air mass flow through the individually configured defroster nozzle ducts 80, the defroster system 50 fabricated as a unitary structure through the use of an additive manufacturing process allows for the ready creation and fabrication of internal ribs 76 within the air supply plenum 70, especially proximate the inlet 72 of the air supply plenum 70 by the HVAC system 38, as shown in FIG. 5, in order to further control and purposefully direct air mass flow through the defroster system 50.

The defroster system 50 fabricated as a unitary structure through the use of an additive manufacturing process in accordance with present disclosure thus provides significant advantages. Alternative and uniform patterns of air discharge over the interior surface 28 of the windshield 22, such as shown in FIGS. 11 and 12, are now readily possible, particularly in the case of a curved windshield, wherein it is desirable for the air mass flow to radiate outwardly from the discharge openings 82 of the individually configured defroster nozzle ducts 80. As shown, the ability to utilize individualized a unique air mass flow to different portions of the interior surface 28 of the windshield 22 and thereby provide the exact velocity and direction of airflow required for each portion of the windshield 22 is the direct result of combining the instrument panel substrate 60, air supply plenum 70, and the individually configured defroster nozzle ducts 80 into a unitary defroster system 50, which thereby creates incredible degrees of freedom in design and resolution of defrosting the windshield 22. Uniform clearing patterns may lead to the potential elimination of physical testing.

In addition to the potential for uniform clearing of the windshield 22, as described above, the elimination of a defroster system fabricated and constructed from multiple parts or elements that are welded or otherwise fastened together tends to reduce the material requirements for the defroster system, thereby resulting in lower weight. In addition, labor assembly costs are eliminated. By forming the defroster system 50 via one of the additive manufacturing process presently available and being developed, an optimal closed-system geometry can be designed to optimize defroster system 50 performance.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An unitary defroster system for a motor vehicle windshield and formed by an additive manufacturing process comprising:
    an instrument panel substrate; and
    an air supply plenum terminating in a plurality of individually configured defroster nozzle ducts conjoined with the instrument panel substrate and aligned in a substantially linear row parallel to and disposed proximate an interior surface of the windshield;
    wherein the ducts are configured and arranged to deliver a substantially uniform air flow pattern to the interior surface of the windshield,
    wherein at least one of the plurality of individually configured defroster nozzle ducts conjoined with the instrument panel substrate has a configuration comprising a reduced cross-sectional profile proximate a discharge opening of the one of the nozzle ducts; and
    wherein the reduced cross-sectional profile proximate the discharge opening of the one of the nozzle ducts comprises an increased wall thickness of a portion of the nozzle duct vertically disposed proximate to and below an outer surface of the instrument panel substrate.

2. The defroster system of claim 1, wherein the increased wall thickness of the portion of the nozzle duct is situated furthest from the windshield.

3. The defroster system of claim 1, wherein at least two of the plurality of individually configured defroster nozzle ducts conjoined with the instrument panel substrate have a unique configuration and the increased wall thickness of the portion of the nozzle duct is vertically disposed at least 2 mm below an outer surface of the instrument panel substrate.

4. The defroster system of claim 3, wherein the unique configuration of the at least two of the plurality of individually configured defroster nozzle ducts conjoined with the instrument panel substrate comprises a discharge angle of the duct defroster nozzle ducts relative the windshield.

5. The defroster system of claim 3, wherein the unique configuration of the at least two of the plurality of individually configured defroster nozzle ducts conjoined with the instrument panel substrate comprises an airflow angle into the duct defroster nozzle ducts relative the air plenum.

6. The defroster system of claim 3, wherein the unique configuration of the at least two of the plurality of individually configured defroster nozzle ducts conjoined with the instrument panel substrate comprises a longitudinal cross section area and/or shape of the duct defroster nozzle ducts.

7. The defroster system of claim 3, wherein the unique configuration of the at least two of the plurality of individually configured defroster nozzle ducts conjoined with the instrument panel substrate comprises a discharge orifice of the duct defroster nozzle ducts, whereby an exit velocity of the airflow from the at least two of the plurality of individually configured defroster nozzle ducts conjoined with the instrument panel substrate is different.

8. The defroster system of claim 7, wherein the unique configuration of the at least two of the plurality of individually configured defroster nozzle ducts conjoined with the instrument panel substrate comprises a constriction proximate the discharge orifice of the duct defroster nozzle ducts.

9. The defroster system of claim 3, wherein the instrument panel substrate is integrated into an upper surface of an instrument panel.

10. The defroster system of claim 3, wherein the instrument panel substrate substantially defines an upper surface of an instrument panel.

11. An unitary defroster system for a motor vehicle windshield comprising:
    an instrument panel substrate; and
    an air supply plenum terminating in a plurality of individually configured defroster nozzle ducts conjoined with the instrument panel substrate and aligned in a substantially linear row parallel to and proximate an interior surface of the windshield;
    wherein the unitary defroster system is formed by an additive manufacturing process and the ducts are configured and arranged to deliver a substantially uniform airflow pattern to the interior surface of the windshield;
    wherein at least one of the plurality of individually configured defroster nozzle ducts conjoined with the instrument panel substrate has a configuration comprising a reduced cross-sectional profile proximate a discharge opening of the one of the nozzle ducts, and
    wherein the reduced cross-sectional profile proximate the discharge opening of the one of the nozzle ducts comprises an increased wall thickness of a portion of the nozzle duct situated furthest from the windshield and vertically disposed at least 2 mm below an outer surface of the instrument panel substrate.

12. The defroster system of claim 11, wherein a spacing between at least three of the plurality of the individually configured defroster nozzle ducts is irregular.

13. The defroster system of claim 11, wherein at least one of the plurality of individually configured defroster nozzle ducts conjoined with the instrument panel substrate has a unique configuration comprising an inclined vane disposed within the one of the duct defroster nozzle duct.

14. The defroster system of claim 11, wherein at least two of the plurality of individually configured defroster nozzle ducts conjoined with the instrument panel substrate have a unique configuration comprising a difference in a vertical length of the duct defroster nozzle ducts.

15. An unitary defroster system for a motor vehicle windshield comprising:
    an instrument panel substrate;
    an HVAC supply source; and
    an air supply plenum in fluid communication with the HVAC supply source and terminating in a plurality of individually configured defroster nozzle ducts conjoined with the instrument panel substrate and aligned in a substantially linear row parallel to and proximate an interior surface of the windshield;
    wherein the unitary defroster system is formed by an additive manufacturing process and at least two of the ducts are configured and arranged to deliver a different air flow to the interior surface of the windshield, wherein at least one of the plurality of individually configured defroster nozzle ducts conjoined with the instrument panel substrate has a configuration comprising a reduced cross-sectional profile proximate a discharge opening of the one of the nozzle ducts; and wherein the reduced cross-sectional profile proximate the discharge opening of the one of the nozzle ducts is situated furthest from the windshield and comprises an increased wall thickness of a portion of the nozzle duct vertically disposed proximate to and below an outer surface of the instrument panel substrate.

16. The defroster system of claim 15, wherein the increased wall thickness of the portion of the nozzle duct is vertically disposed at least 2 mm below the outer surface of the instrument panel substrate.

17. The defroster system of claim 15, wherein the different air flow comprises a difference in a direction of the airflow discharged from at least two of the ducts.

18. The defroster system of claim 15, wherein the different air flow comprises a difference in an air mass flow quantity of the airflow discharged from at least two of the ducts.

* * * * *